(12) United States Patent
Sivasligil et al.

(10) Patent No.: US 11,441,017 B2
(45) Date of Patent: Sep. 13, 2022

(54) ARTICLE OF MANUFACTURE CONTAINING A STARCH-CONVERTED MATERIAL

(71) Applicant: CARGILL, INCORPORATED, Wayzata, MN (US)

(72) Inventors: Dogan Sahin Sivasligil, Overijse (BE); Stephane Biltresse, Etterbeek (BE)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 16/614,012

(22) PCT Filed: May 16, 2018

(86) PCT No.: PCT/US2018/032889
§ 371 (c)(1),
(2) Date: Nov. 15, 2019

(87) PCT Pub. No.: WO2018/213393
PCT Pub. Date: Nov. 22, 2018

(65) Prior Publication Data
US 2021/0155776 A1    May 27, 2021

(30) Foreign Application Priority Data
May 16, 2017  (EP) .................................. 17171311

(51) Int. Cl.
*C08L 3/02*    (2006.01)
(52) U.S. Cl.
CPC ...................... *C08L 3/02* (2013.01)

(58) Field of Classification Search
CPC ...................................................... C08L 3/02
See application file for complete search history.

(56) References Cited

U.S. PATENT DOCUMENTS

| | | | |
|---|---|---|---|
| 3,746,558 A | 7/1973 | Berkhout et al. | |
| 4,095,992 A | 6/1978 | Rudolph et al. | |
| 5,321,132 A | 6/1994 | Billmers | |
| 6,001,927 A | 12/1999 | Billmers et al. | |
| 6,007,614 A | 12/1999 | Billmers et al. | |
| 6,372,361 B1 * | 4/2002 | Mackewicz | C08B 31/04 162/135 |
| 2011/0287165 A1 * | 11/2011 | Shi | C08B 31/04 426/661 |

FOREIGN PATENT DOCUMENTS

| | | |
|---|---|---|
| CN | 1333404 A | 1/2002 |
| CN | 102276851 A | 12/2011 |
| CN | 102952198 A | 3/2013 |
| CN | 103382226 A | 11/2013 |

(Continued)

OTHER PUBLICATIONS

O.B. Wurzburg, "Converted Starches", Ed. Modified Starches: Properties and Uses, CRC Press, Florida, 1987; ISBN 0-8493-5964-3.

(Continued)

*Primary Examiner* — Arrie L Reuther (57) ABSTRACT

The present invention relates to a composition comprising a modified-starch, said starch being modified with an anhydride of a polyacid, said modified-starch having a pH of below 4.5.

19 Claims, 2 Drawing Sheets

(56) References Cited

FOREIGN PATENT DOCUMENTS

| | | | |
|---|---|---|---|
| CN | 105017436 | A | 11/2015 |
| EP | 0545228 | B1 | 9/1996 |
| EP | 0761691 | A2 | 3/1997 |
| EP | 0547551 | B1 | 11/1997 |
| EP | 1170418 | A1 | 1/2002 |
| EP | 1685162 | B1 | 5/2014 |
| EP | 1964969 | B1 | 7/2018 |
| RU | 2528026 | C2 | 5/2012 |
| WO | 2010091091 | A2 | 8/2010 |
| WO | 2015153542 | A1 | 10/2015 |

OTHER PUBLICATIONS

Rupendra Mukerjea et al., "Determination of the maximum water solubility of eight native starches and the solubility of their acidic-methanol and -ethanol modified analogues", Carbohydrate Research, 342 (1), Jan. 15, 2007, pp. 103-110.

* cited by examiner

ARTICLE OF MANUFACTURE CONTAINING A STARCH-CONVERTED MATERIAL

CROSS REFERENCE RELATED

This application is a national phase application of International Application No. PCT/US2018/032889, filed May 16, 2018, entitled ARTICLE OF MANUFACTURE CONTAINING A STARCH-CONVERTED MATERIAL, which claims the benefit of European Patent Application No. 17171311.8, filed May 16, 2017, entitled ARTICLE OF MANUFACTURE CONTAINING A STARCH-CONVERTED MATERIAL, each of which is hereby incorporated by reference in its entirety.

FIELD OF THE INVENTION

The present invention relates to an article of manufacture containing a starch or a starch-derived material, said articles having water-resistance and/or water-barrier properties. In particular the present invention relates to a water-barrier layer. More in particular, the invention relates to a paper containing a water-barrier layer, e.g. in the form of a coating.

BACKGROUND OF THE INVENTION

In packaging and other applications, articles of manufacture such as wrapping material, bags, boxes, corrugated paper, sacks, and the like, having water-resistance and/or water-barrier properties are sometimes needed to prevent the packaged material from getting in contact with water or moisture. In many cases, plastic materials such as polyethylene and polypropylene have been used to provide water-resistance and/or water-barrier properties. While these materials are generally useful as protective coatings, they are less useful when recyclability is desired. A material containing such synthetic polymers loses its biodegradability and recyclability characteristics.

Natural polymers can also be used to provide water-resistance and/or water-barrier properties on packaging materials. Natural polymers are biodegradable and in certain instances may even be recyclable and have the potential to replace the currently used synthetic polymers. Moreover, agriculturally derived alternatives to synthetic polymers provide an opportunity to strengthen the agricultural economy and reduce importation of petroleum and its derivatives.

Biopolymer based packaging materials originating from naturally renewable resources such as polysaccharides, offer favorable environmental advantages of recyclability and reutilization compared to conventional petroleum-based synthetic polymers. In particular starch-based materials have been used in such packaging applications. For example, U.S. Pat. No. 3,746,558 discloses an aqueous suspension of hydrophobic, low DS starch esters which can be used to provide water resistant coatings. U.S. Pat. No. 4,095,992 discloses mixed starch esters of mono- and polycarboxylic acid anhydrides as thermosetting, hydrophobic coatings that provide water resistance. European Patent No. 0545228 shows the use of a mixture of modified-starch and a synthetic polymer as a moisture barrier in moisture resistant sacks. Another European Patent No. 0547551 discloses compositions comprising modified-starch, gelatin, plasticizer, water and lipid as edible films which are effective in providing water, lipid, solute, gas, physical or microbial barriers in foods.

While the starch materials noted above do provide water-resistance and/or water-barrier properties in different applications, they do not provide an article of manufacture which can be easily processed.

In particular, the starch materials noted above cannot be dissolved or dispersed in water even at elevated temperatures, e.g., room temperature to 150° C., and therefore cannot be applied or coated as an aqueous solution. Therefore, these starch materials are either dissolved in organic solvents, or formed into a latex having discrete particles of starch and plasticizer suspended in water. The latex is applied or coated onto the desired substrate and then dried to give a non-continuous film. Heating to a temperature of about the Tg of the starch material or higher, typically about 100 to 200° C., causes the particles to melt and flow, forming a continuous film on the substrate. Such processing may have the drawback that the intense heating utilized for melting the starch material may damage at least partially the starch materials, reducing therefore the effectiveness of the coating in resisting and repelling water. Also in order to produce a coating from such water-insoluble starch materials is cumbersome and expensive. Therefore there is a need in the industry for a new method of creating articles of manufacture from solution rather than from latex dispersions and for articles of manufacture that can be easily made without the need of expensive or complicated processes.

SUMMARY OF THE INVENTION

In an attempt to provide a solution for the above stated problems, the present invention proposes a composition comprising a modified-starch, said starch being modified with an anhydride of a polyacid, said modified-starch having a pH of below 4.5.

The inventors surprisingly observed that the composition of the invention has optimum water resistance and/or optimum water barrier properties. In particular, when said composition is in the form of a coating on a substrate or support, e.g. a paper substrate, a wooden board, a plastic material, a fabric and the like, the composition may present excellent water barrier properties being also stable on said substrate.

Also, when said composition is in the form of a layer sandwiched between other layers or laminated on a supporting surface, said composition enhances or provides the sandwich or the laminate with optimum water resistance and/or optimum water barrier properties.

Other advantages and benefits of the present invention will become apparent from the more detailed description provided hereinbelow.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION OF THE INVENTION

The present invention provides a composition (hereinafter referred to as the "inventive composition") comprising a modified-starch, said modified-starch having a pH of below 4.5. By modified-starch is herein understood a starch obtained by reacting a base-starch with at least an anhydride of a polyacid.

In particular, the inventors observed that the modified-starch is insoluble at room temperature (about 20° C.) in aqueous environments, which have a pH of at most 4.5. The aqueous environment may be water containing a pH regulator or an aqueous solution, suspension or dispersion. Preferably, the aqueous environment comprises at least 75 wt % water, more preferably at least 90 wt % water, most preferably it consists of water and the pH regulator. Preferably, said modified-starch has a solubility in the aqueous environment, said environment having a pH of at most 4.5, of at most 400 mg/mL, more preferably at most 300 mg/mL, most preferably at most 200 mg/mL. Most preferably, said solubility of said modified-starch is at least 0.5 mg/mL, more preferably at least 1.0 mg/mL, most preferably at least 5.0 mg/mL. Preferably, said solubility is between 0.5 and 200 mg/mL; more preferably between 1.0 and 100 mg/mL; most preferably between 5.0 and 20 mg/mL. It is desired to fine-tune the solubility of the modified-starch within the ranges given hereinabove since having a too high solubility may be deleterious in achieving good water resistance or water barrier properties for a composition containing thereof. The inventors also observed that by using modified-starches having a too high solubility, one has to lower their pH to strongly acidic conditions, which in turn may affect the properties of other materials that may come in contact with the inventive composition and may generate salts which may affect said composition's properties.

Preferably, said modified-starch has a solubility in an aqueous environment, said environment having a pH of at least 5.0, of at least 70 wt %, more preferably of at least 80 wt %, most preferably of at least 90 wt %. Preferably, said modified-starch has a solubility in an aqueous environment, said environment having a pH of at least 7.0, of at least 90 wt %, more preferably at of least 95 wt %, most preferably of 100 wt %.

Preferably, said modified-starch has a solubility in an aqueous environment, said environment having a pH of at most 3.0, of at most 20 wt %, more preferably of at most 10 wt %, most preferably of at most 5 wt %. Preferably, said modified-starch has a solubility in an aqueous environment, said environment having a pH of at most 1.0, of at most 5 wt %, more preferably of at most 3 wt %, most preferably of at most 1 wt %.

The base-starch used as the base material for obtaining the modified-starch utilized in the present invention can be sourced from any starch containing sources (hereinafter base material) including for example corn, wheat, potato, tapioca, barley, pea, dent corn, waxy maize, sago, rice, sorghum and high amylose starch, i.e., starch having at least 45% and more particularly at least 65% amylose content, such as high amylose corn. Starch flours may also be used.

The base-starch may be chemically converted, enzymatically converted, or converted by heat treatment or by physical treatment. The term "chemically converted" or "chemical conversion" include, but is not limited to crosslinking, modification with blocking groups to inhibit retrogradation, modification by the addition of lipophilic groups, acetylated starches, hydroxyethylated and hydroxypropylated starches, inorganically esterified starches, cationic, anionic and oxidized starches, zwitterionic starches and combinations thereof. By an "enzymatically converted starch" is herein understood starches converted by enzymes. Heat treatment includes for example pro-gelatinization. The base-starch may have a granular state, which is preferred, or a non-granular state, i.e. the granular state of the starch has been disrupted by physical, thermal, chemical or enzymatic treatment. Preferred base materials to manufacture the base-starches are those chosen from the group consisting of corn starch, wheat starch and potato starch. Most preferred base materials are corn starch and wheat starch.

Preferably, the base-starch is chosen from the group consisting of maltodextrins; pyrodextrins; dextrins such as those prepared by hydrolytic action of acid and/or heat or by the action of enzymes; degraded starches such as for example fluidity or thin boiled starches prepared for example by enzyme conversion, thermal treatment or acid hydrolysis; oxidized starches prepared by treatment with oxidants such as sodium hypochlorite, peroxides and persulfates; and derivatized starches such as cationic, anionic, amphoteric, non-ionic and cross-linked. Any base material can be used for producing these base-starches, such as for example those mentioned above. Preferred base materials include converted or non-converted starches originating from corn, high amylose corn, wheat, potato, tapioca, waxy maize, sago or rice. More preferred base materials are those chosen from the group consisting of corn starch, wheat starch and potato starch. Most preferred base materials are corn starch and wheat starch.

For clarity, by dextrin is herein understood a depolymerized starch prepared by hydrolytic action of acid and/or heat or by the action of enzymes. Preferably, the dextrin used in accordance with the present invention is prepared by depolymerizing the starch with a dry or semi-dry (moisture below 10 wt %) thermal treatment. An example of such treatment is disclosed in EP 1685162 A1.

Preferably, the base-starch is chosen from the group consisting of maltodextrins, dextrins, thin boiled starches and oxidized starches, said base-starch being produced from a base material chosen from the group consisting of non-converted corn starch, non-converted wheat starch and non-converted potato starch.

More preferably, the base-starch is chosen from the group consisting of maltodextrins, dextrins, thin boiled starches and oxidized starches, said base-starch being produced from a base material those chosen from the group consisting of non-converted corn starch and non-converted wheat starch.

Preferably, the modified-starch has a weight average molecular weight (Mw) of at least 1000 Daltons, more preferably at least 1500 Daltons, even more preferably 2,000 Daltons, even more preferably at least 10,000 Daltons, most preferably at least 30,000 Daltons. Said Mw is preferably of at most 2,000,000 Daltons, more preferably at most 1,000,000 Daltons, even more preferably at most 500,000 Daltons, most preferably at most 300,000 Daltons. Preferably, the modified-starch, has a DE of at most 30, more preferably at most 25, most preferably at most 20. Preferably, said DE is at least 1, more preferably at least 5, most preferably at least 10. Preferably, said DE is between 1 and 30, more preferably between 5 and 25, most preferably between 10 and 20.

The Mw of the modified-starch is preferably below 1,000,000 and the DE thereof is preferably below 30. More preferably said Mw is below 500,000 and the DE is below 25. Most preferably said Mw is below 300,000 and the DE is below 20.

Preferably the modified-starch has a polydispersity index (PDI) of from 2 to 25 and more preferably from 4 to 20. The PDI is a measure of the distribution of molecular mass in a given sample. The PDI can be calculated by division of Mw by the number average molecular weight (Mn). It indicates the distribution of individual molecular masses in a batch of samples. The PDI has a value which is always one or more (i.e Mw≥Mn), but as the samples approach uniformity, PDI approaches the unity (PDI→1).

The inventors surprisingly observed that articles of manufacture having optimized water resistance and/or water barrier properties can be manufactured when a modified-starch obtained by the modification in accordance with the invention of a dextrin is used, said dextrin having a weight average molecular weight (Mw) of preferably at least 1000, more preferably at least 1500, more preferably at least 2,000 Daltons, more preferably at least 10,000 Daltons, most preferably at least 30,000 Daltons. Said dextrin preferably has an Mw of at most 2,000,000 Daltons, more preferably at most 1,000,000 Daltons, even more preferably at most 500,000 Daltons, most preferably at most 300,000 Daltons. The dextrin preferably has a Mw below 1,000,000 and a DE below 30. More preferably said Mw is below 500,000 and the DE is below 25. Most preferably said Mw is below 300,000 and the DE is below 20. Preferably said dextrin is prepared from corn, high amylose corn, wheat, potato, tapioca, waxy maize, sago or rice; more preferably said dextrin is prepared from corn starch, wheat starch or potato starch. Most preferably said dextrin is prepared from corn starch or wheat starch. Preferably, said dextrin is prepared by hydrolytic action of acid and/or heat or by the action of enzymes. Most preferably said dextrin is prepared by dry or semi-dry (moisture below 10 wt %) thermal treatment such as disclosed in EP 1685162 A1, which is incorporated herein in its entirety by reference.

In a preferred embodiment, the article of manufacture contains a modified-starch, said modified being obtained by the modification in accordance with the invention of a maltodextrin having a DE of at most 30, more preferably at most 25, most preferably at most 20. Preferably, said DE is at least 1, more preferably at least 5, most preferably at least 10. Preferably, said DE is between 1 and 30, more preferably between 5 and 25, most preferably between 10 and 20. Preferably said maltodextrin is prepared from corn, high amylose corn, wheat, potato, tapioca, waxy maize, sago or rice; more preferably said maltodextrin is prepared from corn starch, wheat starch or potato starch. Most preferably said maltodextrin is prepared from corn starch or wheat starch.

Preferably the PDI of the above-mentioned dextrin or maltodextrin used to manufacture the modified-starch utilized according to the invention, ranges from 2 to 25 and more preferably from 4 to 20.

The modified-starch used in accordance with the invention is modified with an anhydride of a polyacid. The modified-starch used in accordance with the invention has a degree of substitution (DS) of preferably from 0.1 to 2.5, more preferably from 0.1 to 1.5, most preferably of from 0.2 to 1.0. Stated differently, the modified-starch has a DS suitably chosen to make it insoluble in aqueous environments having pHs below 4.5. The term "degree of substitution" as used herein indicates the average number of sites per anhydroglucose unit of the modified-starch molecule on which there are substituent groups.

The modified-starch used in accordance with the invention is obtained reacting the base-starch with at least an anhydride of a polyacid, hereinafter for simplicity being referred as "the anhydride".

Preferably, the anhydride is a cyclic anhydride. More preferably, the anhydride is chosen from the group consisting of maleic and succinic anhydrides. Most preferred succinic anhydrides are those chosen from the group consisting of (alkyl-, alkenyl-, aralkyl- or aralkenyl-) succinic anhydrides. Even more preferably, the anhydride is chosen from the group consisting of alkyl-succinic anhydrides and alkenyl-succinic anhydrides, wherein the alkyl or alkenyl group has from 0 to 20 carbon atoms, most preferably from 0 to 10 carbon atoms. Most preferably, the anhydride is an n-octenyl succinate anhydride (nOSA).

It is known in the art how to manufacture an anhydride-modified-starch, e.g. from U.S. Pat. No. 5,321,132; EP 0761691 or from "Converted Starches", O. B. Wurzburg, Ed. Modified Starches: Properties and Uses, CRC Press, Florida, 1987; ISBN 0-8493-5964-3; See pages 136/137. Preferably, the method to prepare the modified-starch used in accordance with the invention comprises the steps of (i) providing a mixture by pre-dispersing or intimately contacting by mixing at low acidic pH the anhydride with the base-starch to be modified; and (ii) bringing the mixture to reaction conditions.

Preferably, the modified-starch is prepared in accordance with a method wherein the base-starch is reacted with the anhydride in an aqueous system, said method comprising the steps of:

a) Preparing a slurry of the base-starch in water at a pH of at most 9.0, more preferably between 1.0 and 9.0;

b) Maintaining and if necessary adjusting the pH of said slurry to between 5.0 and 9.0, more preferably between 7.0 and 9.0, most preferably between 8.0 and 9.0 while adding the anhydride to the slurry, said anhydride having a formula:

where R is a dimethylene or trimethylene group and R' is a hydrocarbon group having 0 to 20 carbon atoms, more preferably having 0 to 10 carbon atoms;

c) Optionally, intimately contacting the base-starch and the anhydride by mixing to preferable form a stable dispersion, wherein by stable dispersion is herein understood that the dispersion does not show signs of separation for at least the time until said dispersion is further processed;

wherein at step (b), the pH is maintained within the desire range by adding alkali material, e.g. by vigorous stirring, to the slurry and wherein said alkali material is added while adding the anhydride.

The obtained modified-starch has the formula:

where St is the base-starch utilized at step (a), R is a dimethylene or trimethylene group, R' is a hydrocarbon group having 0 to 12 carbons, and Y is H, alkali metal, alkaline earth metal or ammonium.

The anhydride used in the method of this invention has the following structural formula:

where R represents a dimethylene or trimethylene group and R' is a substituent hydrocarbon group having 0 to 20 carbons, more preferably 0 to 12, and most preferably 0 to 8 carbons.

The hydrocarbon or hydrophobic substituent group R' may be alkyl, alkenyl, aralkyl or aralkenyl with alkyl and alkenyl being preferred. R' may be joined to the anhydride moiety R through a carbon-to-carbon bond (as in alkenyl succinic anhydride) or through two carbon-to-carbon bonds (as in the adduct of maleic anhydride with methyl pentadiene, or as in the cyclo-paraffinic cyclo-dicarboxylic acid anhydrides such as cyclo hexane 1,2-dicarboxylic acid anhydride), or may be linked through an ether or ester linkage (as in octyloxy succinic anhydride or in capryloxy succinic anhydride).

The pH at step a) of the method described above, must be at most 9.0, preferably acidic. Preferably, said pH is from 1.0 to 9.0, more preferably from 3.0 to 8.0, most preferably from 5.0 to 7.0. By slurry is herein understood a solution or dispersion of starch in water.

The pH at step b) of the method described above is preferably between 7.5 and 9.0, most preferably between 8.0 and 9.0. The inventors observed that under these conditions, not only that the efficiency of the method increased, but also the properties of the modified-starch were optimized.

Preferably, the composition of the invention contains a modified dextrin, said dextrin being modified with an anhydride of a polyacid, said anhydride being preferably chosen from the group consisting of maleic and succinic anhydrides, more preferably from the group consisting of (alkyl-, alkenyl-, aralkyl- or aralkenyl-) succinic anhydrides. Most preferably said ahydride is n-octenyl succinic anhydride. Said modified dextrin has a DS of preferably, from 0.1 to 2.5, more preferably from 0.1 to 1.5, most preferably of from 0.2 to 1.0. Stated differently, the modified dextrin has a DS suitably chosen to make said dextrin insoluble in aqueous environments, e.g. water, having pHs below 4.5. Preferably, said dextrin has a Mw of at least 2,000 Daltons, more preferably at least 10,000 Daltons, most preferably at least 30,000 Daltons. Said dextrin preferably has an Mw of at most 2,000,000 Daltons, more preferably at most 1,000,000 Daltons, even more preferably at most 500,000 Daltons, most preferably at most 300,000 Daltons. The dextrin preferably has a Mw below 1,000,000 and a DE below 20. More preferably said Mw is below 500,000 and said DE si below 10. Most preferably said Mw is below 300,000 and said DE is below 10. Preferably said dextrin is chosen from the group consisting of corn dextrin, high amylose corn dextrin, wheat, potato dextrin, tapioca dextrin, waxy maize dextrin, sago dextrin and rice dextrin; most preferably said dextrin is chosen from the group consisting of corn dextrin and wheat dextrin. Preferably, said dextrin is prepared by hydrolytic action of acid and/or heat or by the action of enzymes. Most preferably said dextrin is prepared by dry or semi-dry (moisture below 10 wt %) thermal treatment such as disclosed in EP 1685162 A1.

The inventors surprisingly observed that the modified-starch utilized in accordance with the invention, can be solubilized under certain conditions in an aqueous environment, property which to inventors' knowledge was never discovered nor harnessed hitherto. This newly discovered property of said modified-starch enabled the inventors to utilize and process said starch in a completely new way. The invention therefore relates to a liquid mixture containing an aqueous environment and a modified-starch dissolved therein, said liquid mixture having a pH of at least 5.0, said liquid mixture having preferably an NTU of at most 200. Preferably, the pH of said mixture is at least 5.5, more preferably at least 6.0, most preferably at least 6.5. Preferably the NTU of said mixture is at most 150, more preferably at most 100, even more preferably at most 50, yet even more preferably at most 20, most preferably at most 10. The inventors observed that utilizing liquid mixtures having an NTU within the preferred ranges, may enable a better handling thereof and a more precise control over its utilization. Preferably, the liquid mixture contains an amount of at least 10 wt % of the modified-starch relative to the total weight of said mixture, more preferably said amount is at least 20 wt %, most preferably said amount is at least 30 wt %. Said amount is preferably at most 90 wt %, more preferably said amount is at most 80 wt %, most preferably said amount is at most 70 wt %. Preferably, the liquid mixture has a viscosity of at least 30 mPa, more preferably of at least 40 mPa, most preferably of at least 50 mPa. Preferably, said viscosity is at most 5000 mPa, more preferably at most 3000 mPa, most preferably at most 1000 mPa. Preferably said viscosity is between 30 mPa and 5000 mPa, more preferably between 40 mPa and 3000 mPa, most preferably between 50 mPa and 1000 mPa. The inventors observed that by adjusting the viscosity of the liquid mixture within the above mentioned preferred ranges, in particular when said mixture was used to make a coating, an article of manufacture of a higher quality is obtained while also preventing unwanted penetration of said mixture into the support used to coat therewith.

Preferably, the liquid mixture of the invention comprises a dextrin modified with an anhydride of a polyacid, said anhydride being preferably chosen from the group consisting of maleic and succinic anhydrides, more preferably from the group consisting of (alkyl-, alkenyl-, aralkyl- or aralkenyl-) succinic anhydrides. Most preferably said ahydride is n-octenyl succinic anhydride. The DS of said modified dextrin is preferably, from 0.1 to 2.5, more preferably from 0.1 to 1.5, most preferably of from 0.2 to 1.0. Preferred embodiments of Mw, DE and the origin of the starch-base material used to manufacture said dextrin are given above and will not be repeated herein.

The inventors observed that the liquid mixture of the invention can be suitably used as a coating composition, i.e. as a composition for coating various substrates including paper, board or fabric. The invention therefore relates to a coating composition comprising the liquid mixture of the invention. Preferably, said coating composition comprises on a weight basis: (t) 5 to 100 wt % of the liquid mixture, preferably 1 to 20 wt % h, more preferably 1 to 10 wt %, most preferably 2 to 10 wt %; and (H) optionally 1 to 70 wt % of a pigment, preferably 10 to 70 wt %, more preferably 10 to 50 wt %, most preferably 10 to 30 wt %. In one embodiment, the coating composition contains a plasticizer in an amount of preferably from 1 to 20 wt %, more preferably from 1 to 15 wt %, even more preferably from 1 to 10 wt %, most preferably 1 to 5 wt %. In another embodiment, which is mostly preferred, said coating composition is free of plasticizers. Suitable examples of plasticizers are given in WO 2015/153542 and U.S. Pat. No. 6,007,614 which are included herein by reference. One of the advantages of the coating composition of the present invention is that it need not include any silicon-based organic compounds typically required in the manufacture of traditional coatings and, indeed, will preferably be substantially free of these, and other petrochemical-derived or petrochemical-based compounds. Thus, said composition may only contain sustainable and/or bio-based materials. The term "bio-based materials" as used herein refers to materials which are derived from vegetable, animal, or microbial sources such as the modified-starch utilized in accordance with the invention. Preferably, said bio-based materials are derived from vegetable sources. The term "sustainable" means that the materials used to produce the composition of the invention are generated from resources that are sustainable over an extended period of time (i.e. from resources that are not at risk of depletion). Advantageously, when used to coat paper, board or fabric products, compositions of the present invention will not prevent them from being recyclable and/or repulpable.

The invention also relates to a method of making an article of manufacture, comprising the steps of:
  a) providing a liquid mixture containing a modified-starch solubilized in an aqueous environment, said liquid mixture having a pH of at least 5.0, said liquid mixture having preferably an NTU of at most 200;
  b) removing at least part of the water contained by the aqueous environment from said liquid mixture; and
  c) adjusting the pH of the modified-starch to at most 4.5, before, during or after step b).
  d) optionally shaping the pH-adjusted modified-starch.

Preferred embodiments of the liquid mixture are given above and will not be repeated herein. The liquid mixture at step a), preferably has a temperature of at least 10° C., more preferably at least 15° C., more preferably at least 20° C. Preferably, said temperature is at most 80° C., more preferably at most 70° C., more preferably at most 60° C. At step b) of the method of the invention, the water can be removed by any method known in the art, e.g. evaporation, freeze-drying, vacuum-drying and the like. At step c) of the method of the invention, the pH is preferably adjusted to at most 4.5, more preferably at most 4.0, even more preferably at most 3.5, most preferably at most 3.0. Preferably, said pH is at least 1.0, more preferably at least 1.5, most preferably at least 2.0. Preferably said pH is between 1.0 and 4.5, more preferably between 1.5 and 4.0, most preferably between 2.0 and 3.0.

With the method of the invention, the article of manufacture can be easily shaped. For example, the article of manufacture of the invention can be a coating on a support, e.g. paper, plastic, board or fabric; a layer; a binder; a film; a filament; and the like. The inventors observed that the method of the invention allows for the manufacturing of high definition articles of manufacture, such as articles having precise shapes with stable and accurate dimensions, e.g. thickness. Articles having less defects can also be easily manufacture with the method of the invention without the need of elevated temperatures, expensive equipment or complicated processes.

The article of manufacture of the invention is preferably chosen from the group consisting of a coating; a layer, a binder; a film; and a filament. Preferably, said article is a layer or a coating.

The invention relates in particular to a coated support, said support being chosen from the group consisting of paper, plastic, board, metal and fabric, said support being coated with a coating comprising a modified-starch, said modified-starch being a starch modified with an anhydride of a polyacid, said modified-starch having a pH of at most 4.5. The DS of said modified-starch is preferably from 0.1 to 2.5, more preferably from 0.1 to 1.5, most preferably of from 0.2 to 1.0. Preferably, the Mw of said modified-starch is at least 2,000 Daltons, more preferably at least 10,000 Daltons, most preferably at least 30,000 Daltons. The Mw of said modified-starch is preferably at most 2,000,000 Daltons, more preferably at most 1,000,000 Daltons, even more preferably at most 500,000 Daltons, most preferably at most 300,000 Daltons. Said anhydride is preferably chosen from the group consisting of maleic and succinic anhydrides, more preferably from the group consisting of (alkyl-, alkenyl-, aralkyl- or aralkenyl-) succinic anhydrides. Most preferably said ahydride is n-octenyl succinic anhydride. Preferably, said coating comprises a modified dextrin, said dextrin being modified with an anhydride of a polyacid, said dextrin having a pH of at most 4.5. The DS of said modified dextrin is preferably, from 0.1 to 2.5, more preferably from 0.1 to 1.5, most preferably of from 0.2 to 1.0. Preferably, the Mw of said dextrin is at least 2,000 Daltons, more preferably at least 10,000 Daltons, most preferably at least 30,000 Daltons. The Mw of said dextrin is preferably at most 2,000,000 Daltons, more preferably at most 1,000,000 Daltons, even more preferably at most 500,000 Daltons, most preferably at most 300,000 Daltons. The Mw of said dextrin is preferably below 1,000,000 and the DE is preferably below 20. More preferably the Mw is below 500,000 and the DE is below 10. Most preferably the Mw is below 300,000 and the DE is below 10. Preferably said dextrin is prepared from corn, high amylose corn, wheat, potato, tapioca, waxy maize, sago or rice; most preferably said dextrin is prepared from corn or wheat. Preferably, said dextrin is prepared by hydrolytic action of acid and/or heat or by the action of enzymes. Most preferably said dextrin is prepared by dry or semi-dry (moisture below 10 wt %) thermal treatment such as disclosed in EP 1685162 A1.

The invention also relates to the composition of the invention in the form of a layer, said layer having water barrier properties, said composition comprising the modified-starch, having a pH of below 4.5, wherein said layer has a water penetration of at least 20%, more preferably at least 35%, even more preferably at least 50% higher than the same article containing a layer comprising said modified starch having a pH of above 4.5, said water penetration being measured after exposing said article for 20 seconds.

Preferably, at least one surface of the support will be coated. The term "coated" as used herein refers to the fact that a coating having a preferably continuous surface and substantially even thickness when applied to the surface of the support. The coating may be manufacturing by applying the coating composition of the invention on the support using any means known in the art. Conventional coating techniques include, for example, brushing, spreading, dipping, rolling, and wire or knife coating. The technique will be selected depending on the support to be coated. The composition is preferably applied to the support at room temperature, preferably, said temperature is at least 20° C., more preferably at least 25° C., more preferably at least 30°

C. Preferably, said temperature is at most 80° C., more preferably at most 70° C., more preferably at most 60° C. Alternatively—or in addition—application of the coating composition may be followed by a heating or drying step (e.g. air drying, oven drying, hot air treatment). Calendering and/or other finishing techniques may also be used if needed.

Advantageously, the coating composition is applied in one step or in more steps, as it is desired, in an amount of 0.1 to 15 g/m² per step, preferably of 0.5 to 10 g/m² per step, more preferably 1 to 5 g/m² per step. The thickness of the coating may vary within large limits and is dependent on the final application of the coated product. Preferably, the coating is present on a surface of the support in an amount of between 5 and 25 g/m², more preferably between 7 and 20 g/m², most preferably between 10 and 15 g/m².

The preferred support to be coated with the coating composition of the invention is a paper product. The term "paper product" as used herein generally refers to any material produced from cellulosic pulp and includes, by way of example only, sheet paper, glassine paper, paper board, cardboard and card stock. The paper products used for food packaging are particularly preferred. The paper products may be pre-coated or treated using any method known in the art (e.g. calendering) prior to application of the coating of the present invention. When using the coating composition of the invention on paper products a final article having water resistance and/or water barrier properties can be produced while preserving its biodegradability and other environmental properties.

The invention therefore also relates to a paper product, e.g. those mentioned herein above, containing the composition of the invention, wherein said composition is in the form of a coating. The invention also relates to a food packaging material and to a food packaged in said food packaging material, said food packaging material containing the paper product of the invention.

It was found that the modified-starch used in accordance with the invention can be deposited as coatings or layers on supports from low viscosity solutions which can be applied easily thereon without the need of expansive equipment or complicated procedures. Said modified-starch can be subsequently rendered water insoluble by adjusting their pH below 4.5 and thus providing the deposited coating or layer with excellent water resistance or water barrier properties.

The invention further provides a stack comprising first and second layers, whereby the first layers comprise a fabric, a plastic, a board or a paper sheet and the second layers comprise a modified-starch, said starch being modified with an anhydride of a polyacid, said modified starch having a pH of below 4.5. The total number of first and second layers in the stack depends on the application; advantageously, said number is at least 1, i.e. one first layer and one second layer, more preferably at least 2, most preferably at least 3. The first and the second layers in the stack may be clustered together or they may be interposed with each other. In some embodiments, the layers may contain a binder to improve the adhesion therebetween.

The following examples are further illustrating various embodiments of the invention, without however limiting it thereto. In these examples all parts are given by weight and all temperature in degrees Celsius unless otherwise noted.

Methods of Measurement

Mw, Mn of a modified-starch sample was determine as follows: The sample was dissolved in DMSO-water 90-10 v:v at about 2 wt % dry substance. The GPC system used was Waters 600 controller with Waters 717 puls autosampler. Detector water 2414 Refractive index detector. The RI detector system was calibrated with a set of *Pullulans* of known molecular weight. Also, a reference starch having a peak molecular weight of $20.10^6$ (measured by static Light Scattering), and a five units dextrose linear polymer (DP 5) was injected. For each calibrant, the logarithm of the molecular weight is plotted against the retention time. After completion of a run, the data processing system fitted the baseline, and cut the area comprised between the baseline and the chromatogram into a large number of small slices. The area of each slice was recorded, and the molecular weight corresponding to each slice was derived from the calibration curve. Using those data, the data processing system calculated the molecular weights. Column: Shodex KS-806+Shodex KS-804+Shodex KS-802 (all sodium form) in series, at 75° C. Eluent: NaOH 0.05 M in HPLC grade water, filtered through 0.45 um filter, degassed and maintained at about 70° C. Flow: 1.0 ml/min. Injection: 20 µl. Detection: Differential refractive index. Data acquisition: Atlas from Thermo. Data processing; Caliber (GPC package from Polymer Labs).

DE: was determined according to the well-known Lane and Eynon method using the following apparatus. Titrating Assembly: a ring support was mounted on a ringstand 1-2 ins. above a gas burner and a second ring 6-7 ins. above the first. A 6 in. open wire gauze was placed on the lower ring to support a 200 mL Erlenmeyer flask and a 4 in. watch glass with center hole on the upper ring to deflect heat. A 25 mL buret was attached to the ringstand so that the tip just passes through the watch glass centered above the flask (funnel top buret with diagonal TEFLON Plug, KIMAX No. 17055F recommended). An indirectly lighted white surface was placed behind the assembly for observing the end point. The following reagents were used: (i) Fehling's Solution: (A) 34.64 g of reagent grade crystalline copper sulfate pentahydrate (CuSO4.5H2O) was dissolved in purified water and diluted to 500 mL volume. (B) 173 g of reagent grade potassium sodium tartrate tetrahydrate (KnaC4H4O6.4H2O) and 50 g of reagent grade sodium hydroxide (NaOH) were dissolved in purified water and diluted to 500 mL volume. A quantity of (A) was mixed with an equal quantity of (B). (C) A quantity of National Institute of Standards and Technology (NIST) dextrose was dried in a vacuum oven at 70° C. for 4 hrs. 3,000 g thereof was dissolved in purified water, diluted to 500 mL volume and mixed thoroughly. 25.0 mL of mixed Fehling's Solution was pipetted into a 200 mL Erlenmeyer flask that contains a few glass beads, and titrated with the standard dextrose solution as directed under procedure. The concentration of Fehling's Solution A was adjusted by dilution or addition of copper sulfate so that the titration requires 20.0 mL of the 0.6% standard dextrose solution. (ii) Methylene Blue Indicator: 1% aqueous solution. PROCEDURE: an amount of sample was weighed accurately such that after dilution the solution contains about 0.6% reducing sugars. The sample was transferred quantitatively to a 500 mL volumetric flask with the aid of hot water, cool to room temperature, diluted to volume and mixed thoroughly. 25.0 mL of standardized mixed Fehling's Solution was pipetted into a 200 mL Erlenmeyer flask and a few glass beads were added. The sample solution was added by means of the buret to within 0.5 mL of the anticipated end point (determined by preliminary titration). Immediately the flask was placed on the wire gauze of the titration assembly, and the burner adjusted so that the boiling point will be reached in about 2 mins. The solution was brought to boil and boiled gently for 2 mins. As boiling continues, 2 drops of methylene blue indicator were added and the titration was completed within 1 min. by adding sample solution dropwise or in small increments until the blue color disappears. The dry substance concentration of the sample was determined. CALCULATION:

% Reducing Sugars(as is calc. as dextrose)=[(500 mL)(0.1200)(100)]/[Sample Titer, mL)(Sample Wt, g)]

DE=[(% Reducing Sugars)(100)]/(% Dry Substance Content)

See http://corn.org/wp-content/uploads/2009/12/DEXTR.02.pdf and notes therein.

DS: was calculated from the consumption of reagent and caustic (in moles) during reaction: DS=2 [M anhydride]-[M NaOH]/[M starch or dextrin] wherein M [Starch or dextrin]=weight starch used (g)/162 g (=Mw anhdroglucose unit).

Figure 2:
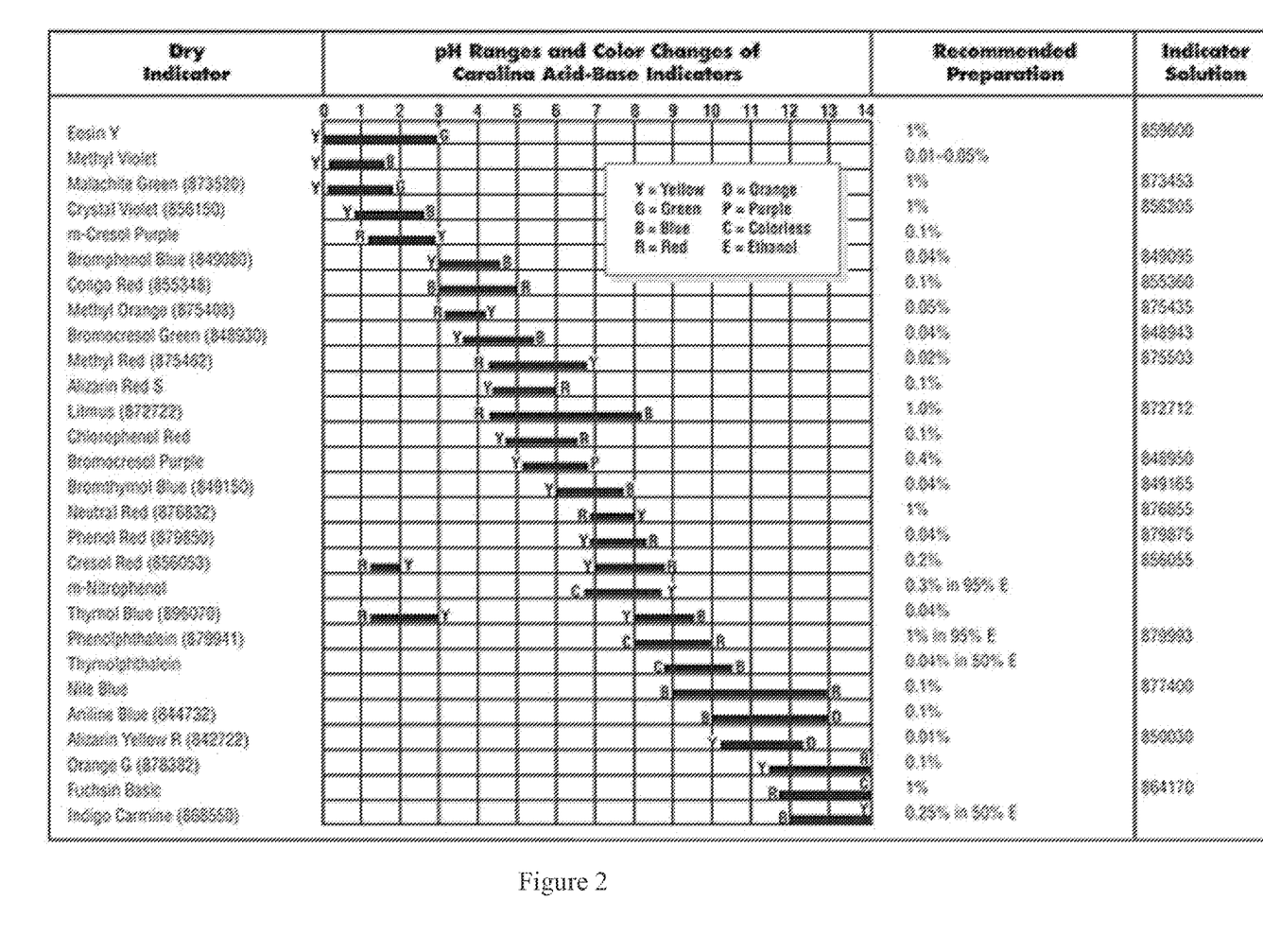
FIG. 2 shows pH indicators and respective amounts used for modified-starch pH determination.

NTU: A measure of the clarity of a liquid. A liquid with high turbidity will appear cloudy or hazy, whilst one with low turbidity will appear clear. Turbidity is determined in Nephelometric Turbidity Units (NTU) using a nephelometer (also known as a turbidimeter, e.g. Hach 2100N— Germany), which measures the propensity of particles in the liquid to scatter light. A turbidimeter is calibrated using pre-mixed Formazin solutions (Stab-Cal 26621-10, Hach-Germany) from 0.1, 20, 200, 1000, 4000 NTU.

pH of a modified-starch was determined as follows: a droplet of a solution consisting of a pH indicator and up to 100 wt % Millipore water was placed on a surface of a sample (usually a coating) consisting of the modified-starch. The used pH indicators and their respective amounts are shown in FIG. 2.

For example, bromocresol green solution (0.04%) was used and showed a blue colour when the coating was under neutral to alkaline conditions. After the acidic treatment, the blue colour disappeared and may become slightly yellowish depending on the colour of the base paper. The local surface pH was determined as at most 2.5-3, according to FIG. 2.

Solubility in mg/mL of modified-starch can be determined according to the methodology described in the experimental section of Rupendra Mukerjea et al., Carbohydrate Res. 342 (2007) 103-110.

Solubility in wt % of modified-starches: was determined as indicated in EP 1964969 A1—see "Methods" section therein.

Determination of water absorption—Cobb method (DIN EN 20535): Determination of the quantity of water absorbed by a paper in a specified time (180 sec) under standardized conditions (23° C., 50% relative humidity), expressed in [g/m$^2$] was carried out using a Cobb tester of 25 cm$^2$ area (=25 ml deionized water). The water was carefully kept in contact with the coated surface of the test paper during determination.

Penetration of water into coated paper—emtec PDA.C 02: The penetration of water into paper was investigated using emtec PDA.C 02 to give information regarding barrier performance. A measuring cell was filled with deionized water according to the defined measuring area (35 mm). Measurement was performed at 2 MHz for 60 sec, calculation was based on general algorithm using automatic normalization (setting start value to 100%).

Moisture content ("MC"): The moisture content of a sample was determined with an infrared moisture balance (MA30, Satorius). The sample was dried at 105° C. The moisture content (in wt %) was calculated as (A1−A2)/A1×100 where A1 was the weight of the sample before drying in the oven and A2 was the weight of the resulted dried sample.

Dry substance content (DSC) is measured according to formula:

DSC (%)=100%−MC (%)

Viscosity: Brookfield (RV, 100 rpm, 25° C., spindle adapted to the viscosity).

Example 1—Maltodextrin Modification with nOSA (DS 0.3)

A maltodextrin (C*Dry MD 01915, Cargill, 500 g on dry basis, Mw of about 2000 Daltons, PDI of between 10 and 20, DE of about 18) was suspended and dissolved in water at room temperature to form a slurry. The slurry was stirred during the entire reaction with an overhead stirrer. First the pH was brought to 8.5 with an 8% w/w NaOH solution. nOSA reagent (229.05 g) was added slowly (30 min) with a pump while maintaining the pH between 8 and 8.5 (with a pH controlled pump). After the nOSA addition reaction continued for 90 min under pH control at room temperature the addition of NaOH addition was stopped. In total 594 g of NaOH solution was consumed during the reacting, resulting in a DS of 0.32 (reaction efficiency 90.9%).

Example 2—Maltodextrin Modification with nOSA (DS 0.7)

A maltodextrin (C*Dry MD 01915, Cargill, 500 g on dry basis) was suspended and dissolved in water at room temperature to form a slurry. The slurry was stirred during the entire reaction with an overhead stirrer. First the pH was brought to 8.5 with an 8% w/w NaOH solution. nOSA reagent (534.45 g) was added slowly (120 min) with a pump while maintaining the pH between 8 and 8.5 (with a pH controlled pump). After the nOSA addition reaction continued for 30 min under pH control at room temperature the addition of NaOH addition was stopped. In total 1477.7 g of NaOH solution was consumed during the reacting, resulting in a DS of 0.69 (reaction efficiency 83.7%).

Example 3—Dextrin Modification with nOSA (DS 0.3)

First a paste of a corn dextrin (C*Film 07325, Cargill, Mw of about 35.800 Daltons, PDI of about 5.5, DE of between 0 and 2) was used to make a 10 wt % slurry of said dextrin in water. The slurry was cooked in a Brabender having the following temperature program: start temperature 50° C., maximum temperature 90° C. (20 min hold), end temperature 50° C. The heating/cooling time was 1.5° C./min and the rotation speed 75/min. The dry solid content of the paste was measured and adapted to the required dry solid content (30 wt %) by adding water at room temperature and stirred to homogenize with an overhead stirrer.

600 g on dry basis of the adjusted paste was taken. The paste was stirred during the entire reaction with an overhead stirrer. First the pH was brought to 8.5 with an 8% w/w NaOH solution. nOSA reagent (274.86 g) was added slowly (80 min) with a pump while maintaining the pH between 8 and 8.5 (using a pH controlled pump) with an 8% w/w NaOH solution. After that nOSA addition reaction continued for the next 40 min under pH control at room temperature after which the NaOH addition was stopped. In total 724 g of NaOH solution was consumed during the reacting, resulting in a DS of 0.31 (reaction efficiency 89.23%).

Example 4—Dextrin Modification with nOSA (DS 0.7)

Example 3 was repeated, with the difference that the amount of nOSA reagent was adjusted to result in a modified dextrin having a DS of 0.7

Examples 5-7—Starch Modification with Acetic Anhydride (AA). Succinic Anhydride (SA) or Maleic Anhydride (MA)

Degradation of Starch

Native corn starch or potato starch was suspended in a solution of 1% $H_2O_2$ and 1% acetic acid and stirred for 5 minutes. The suspension was filtered (to obtain about 55-60% dry solids content suspension). The filter cake was dried overnight (to reach 80% dry solids content) at room temperature in air and subsequently at 130° C. in an oven for 3 hours.

Cooking

10% slurry of the degraded starch was cooked in a Brabender. Temperature program was: start temperature 50° C., maximum temperature 90° C. (20 min hold), end temperature 50° C. The heating/cooling time was 1.5° C./min and the rotation speed 75/min Modification 10 wt % starch solution in water (total 100 g) was reacted under stirring with acetic anhydride (AA), succinic anhydride (SA) or maleic anhydride (MA) at room temperature. The pH was kept at around 8.0-8.5 with 1 N NaOH (pH Stat Titrino 718). SA and MA were added as powder in 15-30 minutes. AA was added in drops with a pipet while stirring.

Examples 8-15—Coating Paper and Post Treatment

The products of Examples 1-7 were used to manufacture solutions having viscosity level between 300-400 mPa*s. The solutions were used to manufacture high quality coatings on paper supports, which were uniform and substantially without defects, while also avoiding penetration onto the paper support.

The coater settings were as follows: Speed: 15 m/min; Roll/rod pressure: 150 N/60 N; Rod: depending on solid content; IR dryer 100%, 100° C., 60 sec; Coat weight: 10+/−1 g/m$^2$ (one-sided double coating "back-to-back"); Base paper: Saica DS 135. Papers were conditioned for at least 24 h within the climate room at 20-25° C. and 30-35% r.h.

For activation of the coating an additional post treatment step (15 sec dipping) into a 1N HCL bath (1N) was done.

Comparative Experiments 1-8

Examples 8-15 were repeated with the (unmodified) starches and dextrins used as the base material for making the modified ones. Several results are also presented in FIG. 1.

Results

Figure 1:
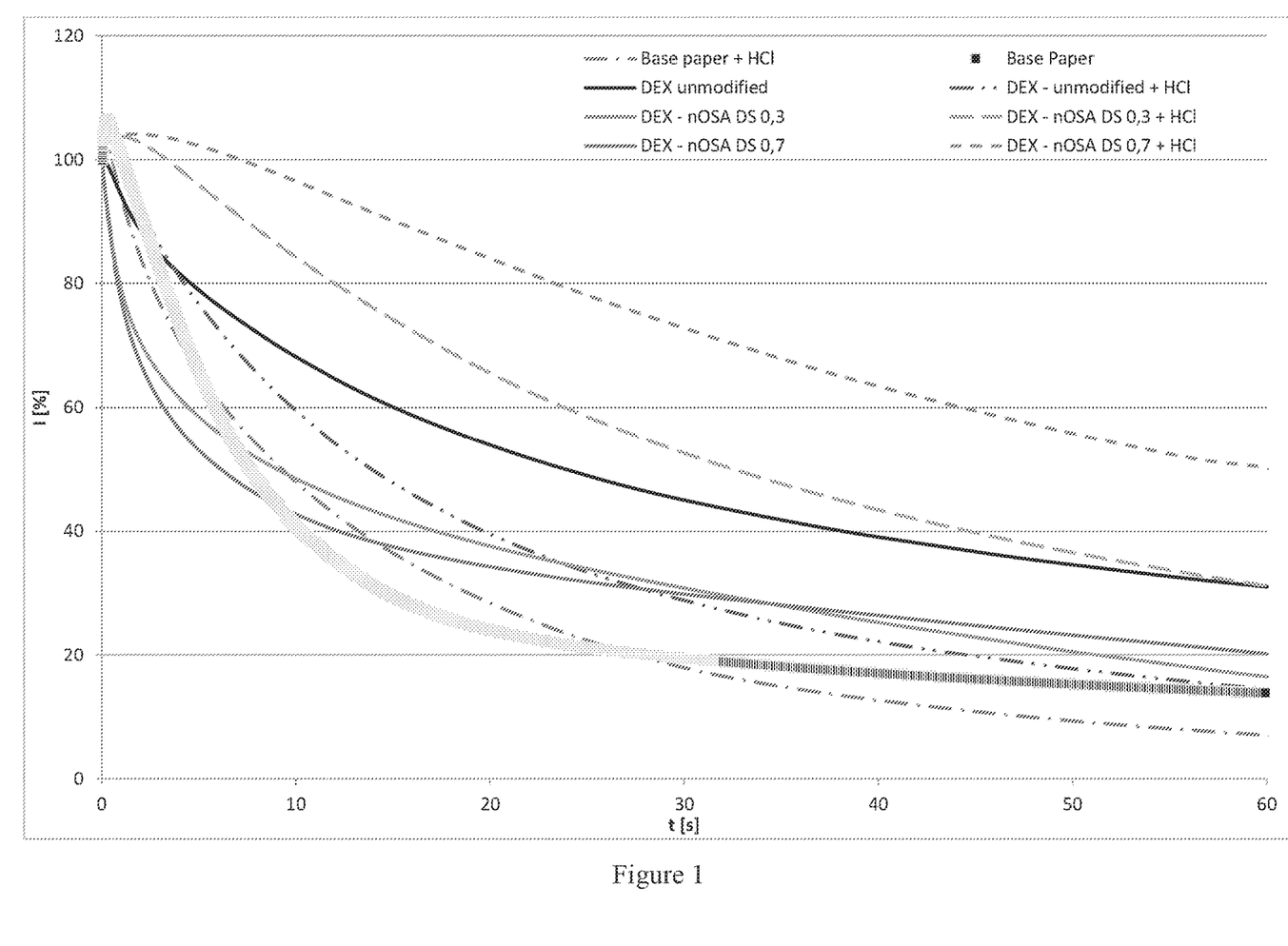
FIG. 1 shows water barrier properties.

The water barrier properties were measured according to the methodologies presented in the section METHODS OF MEASUREMENTS and the results are shown in FIG. 1. In all cases, the modified-starches showed better water barrier properties.

| Starch | Starch (mol) | AA (mol) | SA (mol) | Modification Sequence | DS Acetyl | Efficiency % Acetyl | DS Succinic | Efficiency % Succinic | Precipitation at pH decrease | Solubilization at pH increase | Film soluble in neutral water | Film soluble in acidic water | Film soluble in water after acid treatment |
|---|---|---|---|---|---|---|---|---|---|---|---|---|---|
| Potato | 0.065 | 0.085 | | AA | 0.88 | 67 | | | Precipitates at neutral pH | | | | |
| Potato | 0.063 | 0.075 | | AA | 0.82 | 69 | | | Not reversible | | | | |
| Potato | 0.062 | 0.074 | | AA | 0.81 | 68 | | | | | | | |
| Potato | 0.063 | | 0.063 | SA | | | 0.77 | 77 | Yes | Yes | nm | | |
| Potato | 0.062 | | 0.062 | SA | | | 0.35 | 35 | No | | | | |
| Potato | 0.062 | | 0.062 | SA | | | 0.34 | 34 | Yes | Yes | nm | | |
| Potato | 0.065 | | 0.066 | SA | | | 0.74 | 74 | Yes | Yes | nm | | |
| Corn | 0.064 | | 0.064 | SA | | | 0.65 | 66 | Yes | Yes | nm | | |
| Corn | 0.064 | | 0.064 | SA | | | 0.70 | 70 | Yes | Yes | Yes | Yes | Yes |
| Corn | 0.062 | | 0.124 | SA | | | 1.10 | 55 | Yes | Yes | Yes | Yes | Yes |
| Corn | 0.061 | 0.031 | 0.031 | AA-SA | 0.44 | 86 | 0.32 | 63 | Yes | Yes | Yes | Yes | |
| Corn | 0.062 | 0.032 | 0.093 | AA-SA | 0.45 | 87 | 0.70 | 47 | Yes (3.55) | Yes | Yes | No | No |
| Potato | 0.062 | 0.032 | | SA-AA | 0.18 | 35 | 0.97 | 65 | Yes | Yes | Yes | Yes | |
| Potato granules | 0.123 | 0.126 | | AA | 0.29 | 29 | | | No | | | | |
| Potato granules | 0.123 | | 0.124 | SA | | | 0.29 | 29 | Yes | Yes | Yes | No, becomes soft | No |
| Corn | 0.062 | 0.063 | | AA | 0.81 | 79 | | | No | Yes | Yes | Yes | |
| Corn | 0.062 | 0.047 | 0.015 | AA-SA | 0.61 | 80 | 0.12 | 47 | Yes small (0.7) | Yes | Yes | No, becomes soft | No, fals apart |

-continued

| Starch | Starch (mol) | AA (mol) | SA (mol) | Modification Sequence | DS Acetyl | Efficiency % Acetyl | DS Succinic | Efficiency % Succinic | Precipitation at pH decrease | Solubilization at pH increase | Film soluble in neutral water | Film soluble in acidic water | Film soluble in water after acid treatment |
|---|---|---|---|---|---|---|---|---|---|---|---|---|---|
| Corn | 0.062 | 0.016 | 0.046 | AA-SA | 0.22 | 88 | 0.49 | 65 | Yes (3.51) | Yes | Yes | No, becomes soft | No |
| Corn | 0.061 | | 0.061 | MA | | | 0.71 | 71 | Yes | Yes | | No, stiff | No |
| Corn | 0.060 | | 0.061 | MA | | | 0.03 | 2 | | | | | |
| Corn | 0.062 | 0.063 | 0.062 | AA-SA | 0.78 | 76 | 0.42 | 42 | Yes (4.07) | Yes | Yes, slow | No, becomes soft | No, fals apart |
| Corn | 0.062 | 0.047 | 0.015 | SA-AA | 0.57 | 75 | 0.19 | 76 | Yes (1.5) | Yes | Yes | No, fals apart | No |
| Corn | 0.061 | 0.016 | 0.046 | SA-AA | 0.16 | 63 | 0.52 | 70 | Yes (3.2) | Yes | Yes | No, becomes soft | No |
| Corn | 0.061 | 0.031 | 0.031 | SA-AA | 0.37 | 74 | 0.34 | 68 | Yes (2.19) | Yes | Yes | No, becomes soft | No |
| Corn | 0.061 | 0.062 | 0.061 | SA-AA | 0.49 | 48 | 0.65 | 72 | Yes (3.85) | Yes | Yes | Yes | |

The invention claimed is:

1. A composition comprising:
a modified-dextrin having a weight average molecular weight (Mw) of 1,000 to 300,000 daltons, said dextrin being modified with an anhydride of a polyacid, said modified dextrin having a pH of below 4.5;
wherein
the modified-dextrin has a solubility in an aqueous environment comprising at least 75% water at a pH of at least 5.0 of at least 70 wt %, and
the modified-dextrin has a solubility in an aqueous environment comprising at least 75% water at a pH of less than 3.0 of at most 20 wt %.

2. The composition of claim 1 wherein said modified-dextrin has a degree of substitution (DS) of above 0.1.

3. The composition of claim 2 wherein said anhydride contains a C1-C10 polyacid.

4. The composition of claim 2 wherein said anhydride is a succinic anhydride or n-octenyl succinic anhydride (nOSA).

5. The composition of claim 1 wherein said anhydride contains a C1-C10 polyacid.

6. The composition of claim 5 wherein said anhydride is nOSA and the modified-dextrin has a degree of substitution (DS) of above 0.1.

7. The composition of claim 1 wherein said anhydride is a succinic anhydride or n-octenyl succinic anhydride (nOSA).

8. The composition of claim 7 wherein the modified-dextrin has a degree of substitution (DS) of above 0.1.

9. The composition of claim 1 wherein said anhydride is n-octenyl succinic anhydride (nOSA) and the modified-dextrin has a degree of substitution (DS) of above 0.1.

10. The composition of claim 1 wherein said composition is in a form of a layer or a matrix.

11. The composition of claim 1 wherein said composition is in the form of a layer having water barrier properties.

12. The composition of claim 1 wherein said composition is in the form of a layer, said layer having water barrier properties, said composition comprising the modified-dextrin, having a pH of below 4.5, wherein said layer has a water penetration of at least 20% higher than the same article containing a layer comprising the modified dextrin having a pH of above 4.5, said water penetration being measured after exposing said article for 20 seconds.

13. The composition of claim 1 wherein said modified-dextrin has a degree of substitution (DS) of 0.1-2.5.

14. The composition of claim 1 wherein said anhydride contains a C1-C10 polyacid.

15. The composition of claim 1 wherein said anhydride is a succinic anhydride or n-octenyl succinic anhydride (nOSA).

16. The composition of claim 1 wherein said anhydride is nOSA and the modified-dextrin has a degree of substitution (DS) of above 0.1.

17. The composition of claim 1, wherein the anhydride modified-dextrin is a mono-anhydride modified-dextrin.

18. The composition of claim 1, wherein the modified-dextrin in an aqueous environment comprising at least 75 wt % water at a pH of ≤4.5 has a solubility 0.5 to 200 mg/mL.

19. The composition of claim 1, wherein the modified-dextrin in an aqueous environment comprising at least 75 wt % water at a pH of ≤4.5 has a solubility 0.5 to 20 mg/mL.

* * * * *